(12) United States Patent
Park et al.

(10) Patent No.: US 12,283,895 B2
(45) Date of Patent: Apr. 22, 2025

(54) INTEGRATED POWER CONVERSION APPARATUS FOR ELECTRIC VEHICLE AND CONTROL METHOD THEREOF

(71) Applicant: UIF (University Industry Foundation), Yonsei University, Seoul (KR)

(72) Inventors: Jung Wook Park, Seoul (KR); Issac Kim, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 190 days.

(21) Appl. No.: 18/341,615

(22) Filed: Jun. 26, 2023

(65) Prior Publication Data

US 2024/0364228 A1   Oct. 31, 2024

(30) Foreign Application Priority Data

Apr. 25, 2023   (KR) ......................... 10-2023-0054111

(51) Int. Cl.
   *B60L 58/20* (2019.01)
   *B60L 53/22* (2019.01)
   (Continued)

(52) U.S. Cl.
   CPC ............... *H02M 5/46* (2013.01); *B60L 53/22* (2019.02); *B60L 53/24* (2019.02); *B60L 55/00* (2019.02); *H02P 27/06* (2013.01); *B60L 2210/10* (2013.01); *B60L 2210/30* (2013.01); *B60L 2240/547* (2013.01)

(58) Field of Classification Search
   CPC ........ H02M 5/46; H02M 3/337; H02M 1/007; H02M 3/33561; H02M 3/33573; H02M 3/33584; H02M 7/797; H02M 3/285; H02M 1/0067; H02P 27/06
   See application file for complete search history.

(56) References Cited

U.S. PATENT DOCUMENTS

2016/0121741 A1   5/2016  Kim
2019/0061553 A1*  2/2019  Yang ....................... B60L 58/22
                          (Continued)

FOREIGN PATENT DOCUMENTS

KR   10-2017-0131895 A   12/2017
KR   10-2442378 B1        9/2022

*Primary Examiner* — Muhammad S Islam
(74) *Attorney, Agent, or Firm* — BROADVIEW IP LAW, PC

(57) ABSTRACT

An integrated power conversion apparatus for an electric vehicle according to the present disclosure includes a first H-bridge converter with one side connected to a high voltage battery; a three-winding transformer in which a primary winding is connected to the other side of the first H-bridge converter; a second H-bridge converter with one side which is connected to a secondary winding of the three-winding transformer; an AC-DC converter in which one side is connected to the other side of the second H-bridge converter and the other side is selectively connected to a motor or a power system; and a low voltage stage converter in which one side is selectively connected to a tertiary winding of the three-winding transformer through a selective switch and the other side is connected to a low voltage battery.

12 Claims, 14 Drawing Sheets

(51) Int. Cl.
  *B60L 53/24*    (2019.01)
  *B60L 55/00*    (2019.01)
  *H02M 5/46*    (2006.01)
  *H02P 27/06*    (2006.01)

(56) References Cited

U.S. PATENT DOCUMENTS

2019/0148973 A1\* 5/2019 Kim .......................... H02J 7/06
                                                  320/109
2020/0023746 A1\* 1/2020 Kim ........................ B60L 53/14
2021/0155100 A1\* 5/2021 Khaligh .................. B60L 55/00

\* cited by examiner

INTEGRATED POWER CONVERSION APPARATUS FOR ELECTRIC VEHICLE AND CONTROL METHOD THEREOF

CROSS-REFERENCE TO RELATED APPLICATION

This application claims priority under 35 U.S.C § 119 to Korean Patent Application No. 10-2023-0054111, filed in the Korean Intellectual Property Office on Apr. 25, 2023, the entire contents of which are hereby incorporated by reference.

BACKGROUND

Field

The present disclosure relates to an integrated power conversion apparatus for an electric vehicle and a control method thereof.

Description of the Related Art

FIG. 1 illustrates a configuration of an isolated power conversion system for an electric vehicle of the related art.

An on-board charger OBC increases a power factor of a power from a power system (grid) using a power factor compensation circuit (PFC converter) and then operates while converting an output voltage of this circuit in accordance with a high voltage battery (HVB) through a DC-DC converter (G2V mode). Further, in order to transmit the power to the power system, a DC-link voltage is converted into a voltage suitable for the power transmission by a DC-DC converter and transmits the power to the power system using a PFC converter based on this (V2G mode). A low voltage battery charger (a low voltage DC/DC converter, LDC) operates while dropping the voltage of the high voltage battery to a low voltage of an auxiliary battery through a DC/DC converter (LDC mode). A traction converter (TC) raises a voltage of the high voltage battery using a high voltage DC/DC converter (HDC) and adjusts an input voltage of an inverter and the traction inverter drives a motor using the voltage (a TC mode).

That is, a power conversion system installed in the electric vehicle charges and discharges the high voltage battery by means of the OBC and charges the auxiliary battery using the high voltage battery by means of the LDC. Further, the power conversion system drives the motor by means of the TC with a high voltage battery as an input. That is, two power conversion apparatuses (OBC and LDC) configure the battery charging system and the TC serves to drive the motor.

A power conversion system of the electric vehicle is configured by three DC-DC converters including a DC-DC converter for OBC, a DC-DC converter for LDC, and a DC-DC converter for TC, as illustrated with a blue box in FIG. 1, and individual roles are as follows.

DC-DC converter for OBC: Adjust a voltage of a high voltage battery for a high voltage battery charging mode (G2V mode) and adjust a DC-link voltage between the DC-DC and the PFC for a mode (V2G mode) which discharges the high voltage battery to transmit the power to the system DC-DC converter for LDC: Adjust a voltage for charging a low voltage battery DC-DC converter for TC: Adjust a DC-link voltage between a DC-DC converter and a three-phase inverter to drive an electric vehicle However, when the DC-DC converters for OBC, LDC, and TC are individually configured, there is a problem in that a number of switches and elements is increased to increase a volume of the entire power conversion system configured by a charging system and the TC and increase the cost.

Currently, in order to solve this problem, studies are conducted to integrate charging systems for charging a high voltage battery and a low voltage battery, that is, integrate the DC-DC converter of the OBC and the LDC to charge two batteries using one circuit. Further, studies are conducted to integrate the OBC and the TC by integrating the DC-DC converter of the OBC and the DC-DC converter of the TC and integrating a PFC converter of the OBC and the tractor inverter.

However, an integration method which minimizes a volume and a cost while performing all the operations of the related art, that is, an integrated power conversion system which integrates all three power conversion apparatuses including the on-board battery charger (OBC), the low voltage battery charger (LDC), and the traction converter (TC) has not been studied.

SUMMARY

Accordingly, a technical object to be achieved by the present disclosure is to provide an integrated power conversion apparatus for an electric vehicle which integrates all three power conversion apparatuses including the on-board battery charger (OBC), the low voltage battery charger (LDC), and the traction converter (TC) to perform all the operations of the related art while reducing the volume and the cost by minimizing a number of all the elements and a control method thereof.

The technical object to be achieved by the present invention is not limited to the above-mentioned technical objects, and other technical objects, which are not mentioned above, can be clearly understood by those skilled in the art from the following descriptions.

In order to achieve the above-described technical objects, according to an aspect of the present disclosure, an integrated power conversion apparatus for an electric vehicle includes a first H-bridge converter with one side connected to a high voltage battery; a three-winding transformer in which a primary winding is connected to the other side of the first H-bridge converter; a second H-bridge converter with one side which is connected to a secondary winding of the three-winding transformer; an AC-DC converter in which one side is connected to the other side of the second H-bridge converter and the other side is selectively connected to a motor or a power system; and a low voltage stage converter in which one side is selectively connected to a tertiary winding of the three-winding transformer through a selective switch and the other side is connected to a low voltage battery.

The first H-bridge converter includes first and second switches which configure a leading leg and third and fourth switches which configure a lagging leg and the second H-bridge converter includes fifth and sixth switches which configure a leading leg and seventh and eighth switches which configure a lagging leg.

The integrated power conversion apparatus further includes a controller which controls the switching of the first to fourth switches of the first H-bridge, the fifth to eighth switches of the second H-bridge converter, and the selective switch to operate in any one of a G2V mode which charges the high voltage battery with a power supplied from the power system, a V2G mode which transmits the power of the high voltage battery to the power system, an LDC-TC mode which drives the motor while charging the low voltage battery with a power of the high voltage battery, an SC mode which simultaneously charges the high voltage battery and the low voltage battery with the power supplied from the power system, and an LDC mode which charges the low voltage battery with the power of the high voltage battery.

When it is controlled to operate in the G2V mode, the other side of the AC-DC converter is connected to the power system, the controller opens the selective switch to separate the low voltage stage converter from the tertiary winding of the three-winding transformer and controls the switching such that switching signals of the fifth and eighth switches precede switching signals of the first and fourth switches and switching signals of the sixth and seventh switches precede switching signals of the second and third switches.

When it is controlled to operate in the V2G mode, the other side of the AC-DC converter is connected to the power system, the controller opens the selective switch to separate the low voltage stage converter from the tertiary winding of the three-winding transformer and controls the switching such that switching signals of the first and fourth switches precede switching signals of the fifth and eighth switches and switching signals of the second and third switches precede switching signals of the sixth and seventh switches.

When it is controlled to operate in the LDC-TC mode, the other side of the AC-DC converter is connected to the motor and the controller shorts the selective switch to connect the low voltage stage converter to the tertiary winding of the three-winding transformer, adjusts a section in which the first and fourth switches, the second and third switches, the fifth and eighth switches, and the sixth and seventh switches are simultaneously turned on by means of a phase shift between the leading leg configured by the first and second switches and the lagging leg configured by the third and fourth switches of the first H-bridge converter and a phase shift between the leading leg configured by the fifth and sixth switches and the lagging leg configured by the seventh and eighth switches of the second H-bridge converter and adjusts a phase shift section between the first and fourth switches and the fifth and eighth switches and between the second and third switches and the sixth and seventh switches.

When it is controlled to operate in the SC mode, the other side of the AC-DC converter is connected to the power system and the controller shorts the selective switch to connect the low voltage stage converter to the tertiary winding of the three-winding transformer, adjusts a section in which the fifth and eighth switches, the sixth and seventh switches, the first and fourth switches, and the second and third switches are simultaneously turned on by means of a phase shift between the leading leg configured by the fifth and sixth switches and the lagging leg configured by the seventh and eighth switches of the second H-bridge converter and a phase shift between the leading leg configured by the first and second switches and the lagging leg configured by the third and fourth switches of the first H-bridge converter and adjusts a phase shift section between the fifth and eighth switches and the first and fourth switches and between the sixth and seventh switches and the second and third switches.

When it is controlled to operate in the LDC mode, the other side of the AC-DC converter is connected to the motor and the controller shorts the selective switch to connect the low voltage stage converter to the tertiary winding of the three-winding transformer and charges the low voltage battery by means of a phase shift between the leading leg configured by the first and second switches and the lagging leg configured by the third and fourth switches of the first H-bridge converter.

The high voltage battery is connected to an upper contact of the first switch and the third switch and a lower contact of the second switch and the fourth switch, the primary winding is connected to a contact between the first switch and the second switch and a contact between the third switch and the fourth switch, one side of the AC-DC converter is connected to an upper contact of the fifth switch and the seventh switch and a lower contact of the sixth switch and the eighth switch, and the secondary winding is connected to a contact between the fifth switch and the sixth switch and a contact between the seventh switch and the eighth switch.

The low voltage stage converter includes a ninth switch and a tenth switch, the tertiary winding is connected to an upper contact of the ninth switch and a lower contact of the tenth switch, and the low voltage battery is connected to an upper contact of the ninth switch and a contact between the ninth switch and the tenth switch.

In order to achieve the above-described technical objects, according to another aspect of the present disclosure, a control method of an integrated power conversion apparatus for an electric vehicle including: a three-winding transformer in which a primary winding is connected to the other side of the first H-bridge converter; a second H-bridge converter with one side which is connected to a secondary winding of the three-winding transformer; an AC-DC converter in which one side is connected to the other side of the second H-bridge converter and the other side is selectively connected to a motor or a power system; and a low voltage stage converter in which one side is selectively connected to a tertiary winding of the three-winding transformer through a selective switch and the other side is connected to a low voltage battery, the first H-bridge converter includes first and second switches which configure a leading leg and third and fourth switches which configure a lagging leg and the second H-bridge converter includes fifth and sixth switches which configure a leading leg and seventh and eighth switches which configure a lagging leg, the method includes controlling the switching of the first to fourth switches of the first H-bridge converter, the fifth to eighth switches of the second H-bridge, and the selective switch.

The controlling of the switching includes controlling to operate in any one of a G2V mode which charges the high voltage battery with a power supplied from the power system, a V2G mode which transmits the power of the high voltage battery to the power system, an LDC-TC mode which drives the motor while charging the low voltage battery with a power of the high voltage battery, an SC mode which simultaneously charges the high voltage battery and the low voltage battery with the power supplied from the power system, and an LDC mode which charges the low voltage battery with the power of the high voltage battery.

According to the present disclosure, all three power conversion apparatuses including the on-board battery charger (OBC), the low voltage battery charger (LDC), and the traction converter (TC) are integrated to perform all the operations of the related art while reducing the volume and the cost by minimizing the number of all the elements.

Effects of the present invention are not limited to the above-mentioned effects, and other effects, which are not mentioned above, can be clearly understood by those skilled in the art from the following descriptions.

DETAILED DESCRIPTION OF THE EMBODIMENT

Figure 1:
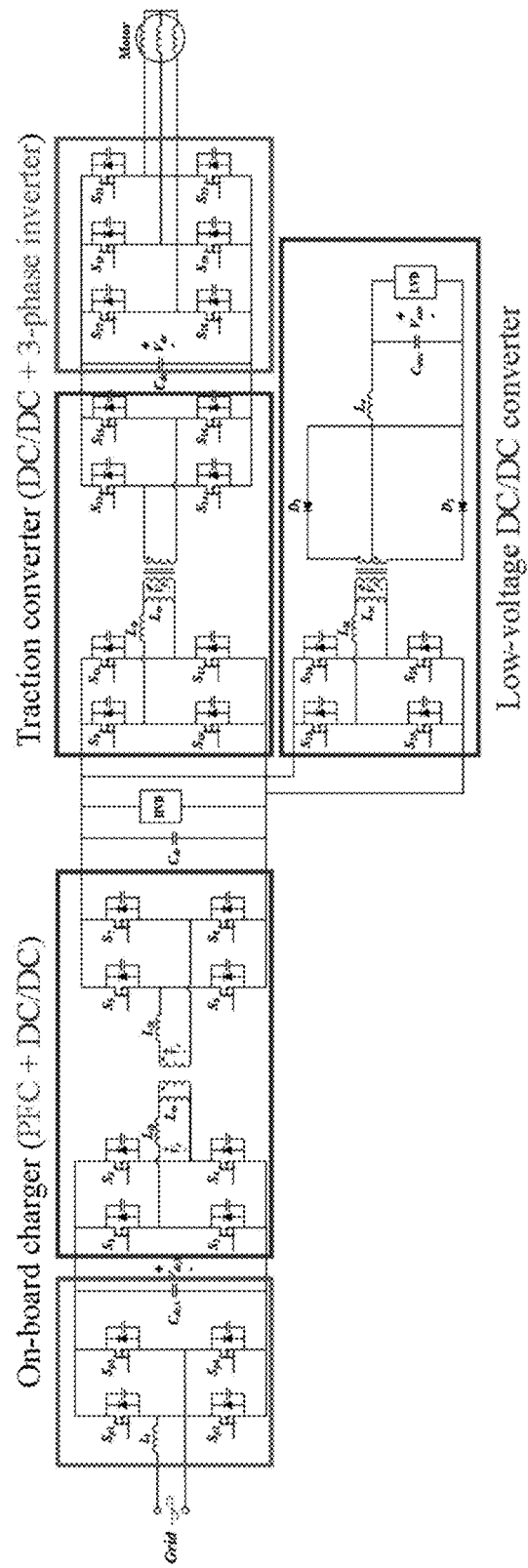
FIG. 1 illustrates a configuration of an isolated power conversion system for an electric vehicle of the related art.

Hereinafter, embodiments of the present disclosure will be described in detail with reference to the accompanying drawings. Advantages and characteristics of the present disclosure and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "~unit" used in the specification refers to a software or hardware component such as a field programmable gate array (FPGA) or an ASIC and "~unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data, database, and data structures. A function which is provided in the components and "~units" may be combined with a smaller number of components and "~units" or divided into additional components and "~units".

Figure 2:
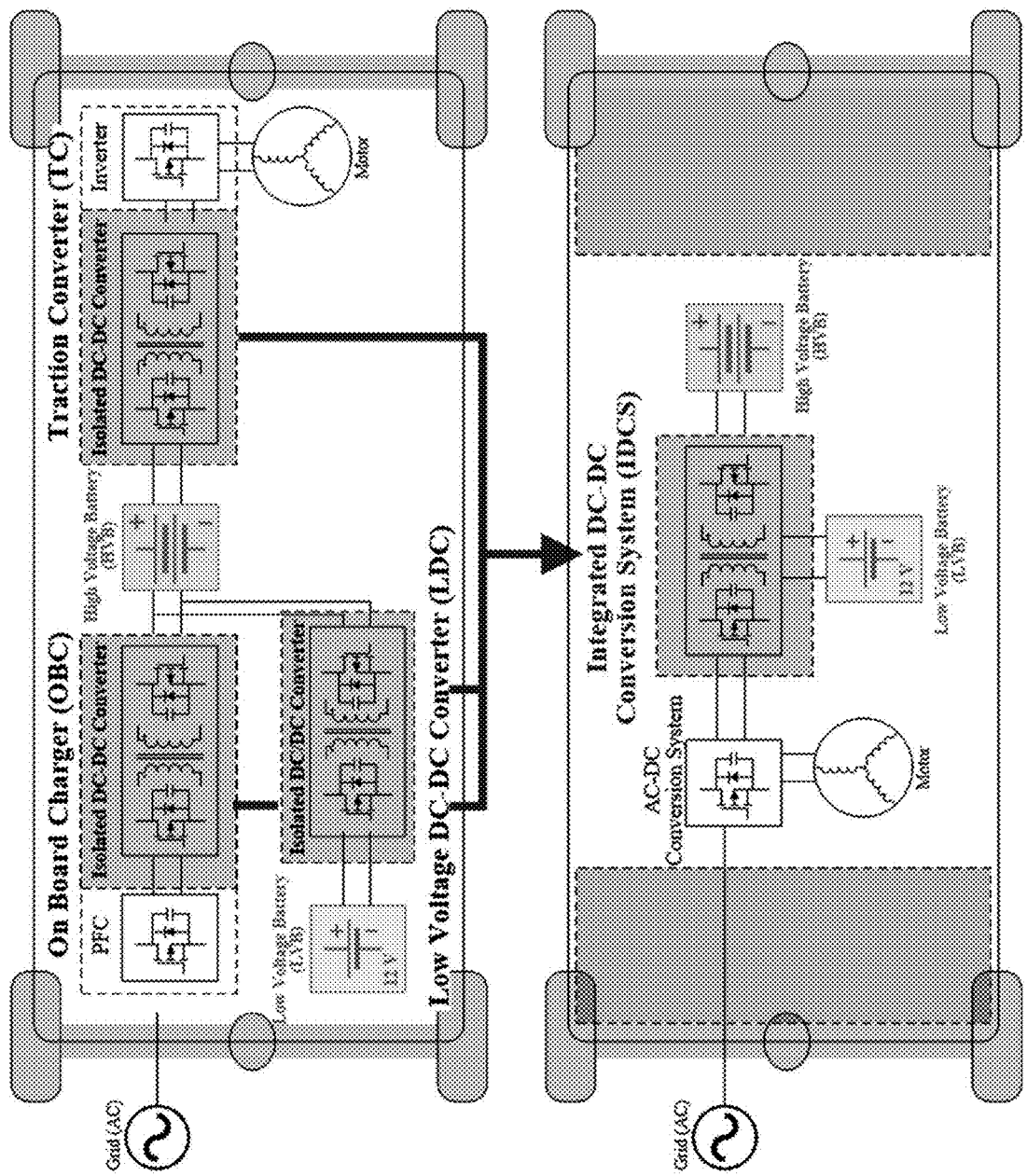
FIG. 2 is a comparison concept of an isolated power conversion system for an electric vehicle of the related art and an integrated power conversion system according to an exemplary embodiment of the present disclosure.

FIG. 2 is a comparison concept of an isolated power conversion system for an electric vehicle of the related art and an integrated power conversion system according to an exemplary embodiment of the present disclosure.

Referring to FIG. 2, a DC-DC power conversion system which configures an isolated power conversion system of the related art is illustrated in an upper blue box and an integrated power conversion apparatus according to the exemplary embodiment of the present disclosure is illustrated in a lower blue box. The integrated power conversion apparatus according to the exemplary embodiment of the present disclosure is configured with a structure in which DC-DC converters of an on-board charger OBC for an electric vehicle, a low voltage battery charger LDC, and a traction converter TC are integrated as one DC-DC converter.

At this time, the integrated power conversion apparatus needs to perform all the operations of the isolated power conversion system of the related art. That is, the integrated power conversion apparatus needs to perform all the G2V mode which charges the high voltage battery, the V2G mode which controls a voltage required to supply the power to the power system, the LDC mode which charges a low voltage battery during the driving, and the TC mode which controls a voltage required to drive a motor and supplies a power. Further, the OBC, LDC, and TC are integrated by one converter so that an operation which simultaneously controls two loads with one input needs to be also performed. That is, in order to discharge the low voltage battery, a function (SC mode) which simultaneously charges the high voltage battery and the low voltage battery needs to be performed. Further, in order to use electrical components, such as an air conditioner, during the driving of the vehicle, a function (LDC-TC mode) which controls a voltage and supplies the power to drive the vehicle while charging a low voltage battery which supplies a power to the electrical components needs to be performed. That is, five modes of G2V, V2G, LDC, LDC-TC, and SC modes need to be performed.

Figure 3:
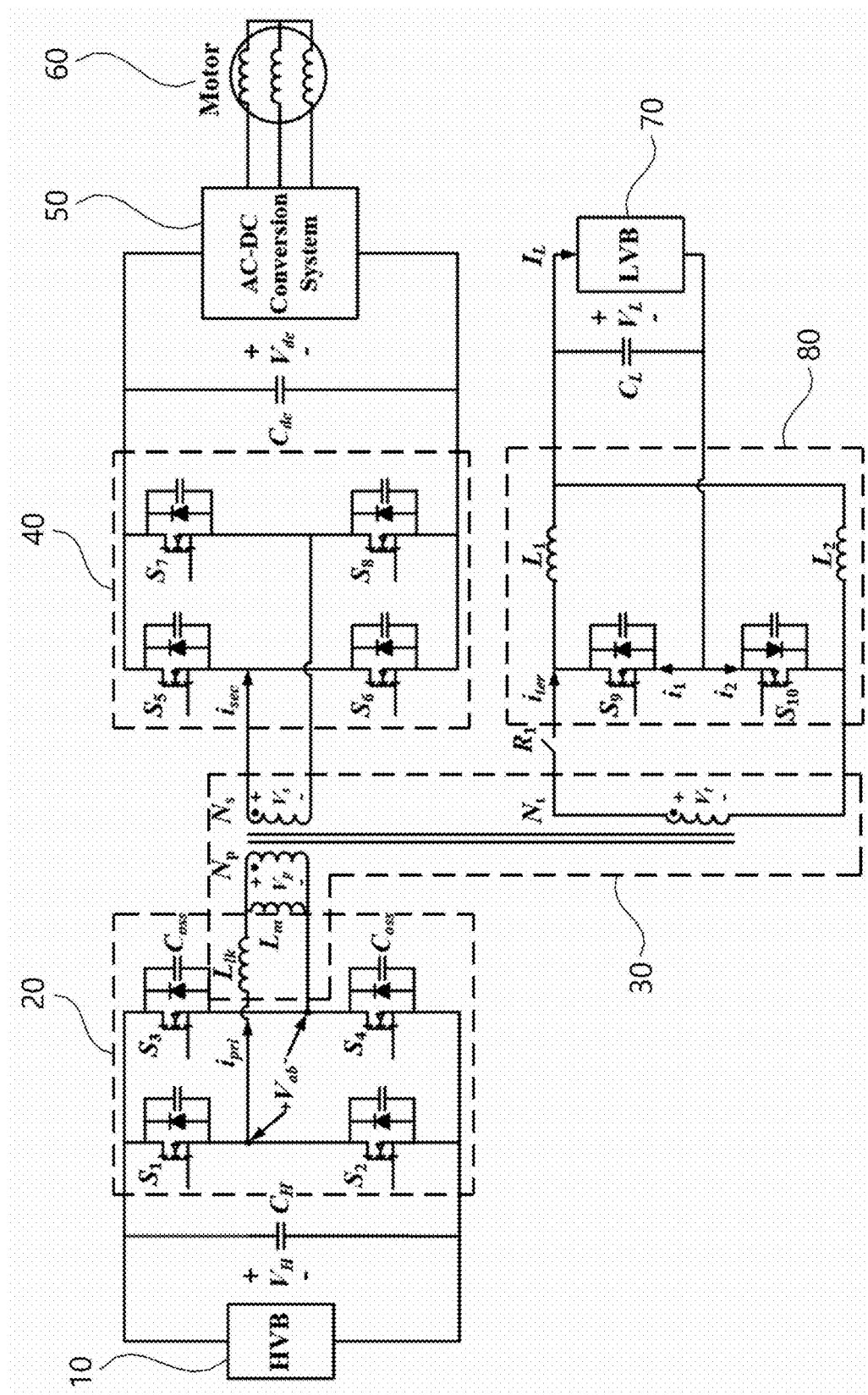
FIG. 3 is a diagram illustrating a configuration of an integrated power conversion apparatus according to an exemplary embodiment of the present disclosure.

FIG. 3 is a diagram illustrating a configuration of an integrated power conversion apparatus according to an exemplary embodiment of the present disclosure.

The integrated power conversion apparatus according to the exemplary embodiment of the present disclosure includes a first H-bridge converter 20, a three-winding transformer 30, a second H-bridge converter 40, an AC-DC converter 50, and a low voltage stage converter 80.

One side of the first H-bridge converter 20 is connected to a high voltage battery 10. The three-winding transformer 30 includes a primary winding Np, a secondary winding Ns, and a tertiary winding Nt. The primary winding Np of the three-winding transformer 30 is connected to the other side of the first H-bridge converter 20. One side of the second H-bridge converter 40 is connected to the secondary winding Ns of the three-winding transformer 30.

One side of the AD-DC converter 50 is connected to the other side of the second H-bridge converter 40 and the other side is selectively connected to the motor 60 or a power system (not illustrated). The AC-DC converter 50 may be a three-phase inverter. Even though it is not illustrated, the AC-DC converter 50 may include a switch to be selectively connected to the motor 60 or the power system.

One side of the low voltage stage converter 80 is selectively connected to the tertiary winding Nt of the three-winding transformer 30 by means of a selective switch R1 and the other side is connected to the low voltage battery 70.

The first H-bridge converter 20 and the second H-bridge converter 40 configure a dual active bridge (DAB) converter. The first H-bridge converter 20 includes first and second switches S1 and S2 which configure a leading leg and third and fourth switches S3 and S4 which configure a lagging leg. The second H-bridge converter 40 includes fifth and sixth switches S5 and S6 which configure a leading leg and seventh and eighth switches S7 and S8 which configure a lagging leg.

The high voltage battery 10 is connected to an upper contact of the first switch S1 and the third switch S3 and a lower contact of the second switch S2 and the fourth switch S4. The primary winding Np is connected to a contact between the first switch S1 and the second switch S2 and a contact between the third switch S3 and the fourth switch S4.

The secondary winding Ns is connected to a contact between the fifth S5 and the sixth switch S6 and a contact between the seventh switch S7 and the eighth switch S8. One side of the AC-DC converter 50 is connected to an upper contact of the fifth switch S5 and the seventh switch S7 and a lower contact of the sixth switch S6 and the eighth switch S8.

The low voltage stage converter includes a ninth switch S9 and a tenth switch S10. The tertiary winding Nt is connected to an upper contact of the ninth switch S9 and a lower contact of the tenth switch S10. The low voltage battery 70 is connected to the upper contact of the ninth switch S9 and a contact between the ninth switch S9 and the tenth switch S10.

Even though it is not illustrated, the integrated power conversion apparatus according to the exemplary embodiment further includes a controller which controls the switching of the first to fourth switches S1, S2, S3, and S4 of the first H-bridge converter 20, the fifth to eighth switches S5, S6, S7, and S8 of the second H-bridge converter 20, and the selective switch R1. The controller controls the switching of the switches to operate in any one of the G2V mode which charges the high voltage battery 10 with a power supplied from the power system, the V2G mode which transmits a power of the high voltage battery 10 to the power system, the LDC-TC mode which drives the motor 60 while charging the low voltage battery 70 with a power of the high voltage battery 10, the SC mode which simultaneously charges the high voltage batter 10 and the low voltage battery 70 with a power supplied from the power system, and the LDC mode which charges the low voltage battery 70 with the power of the high voltage battery 10 during the driving.

Figure 4:
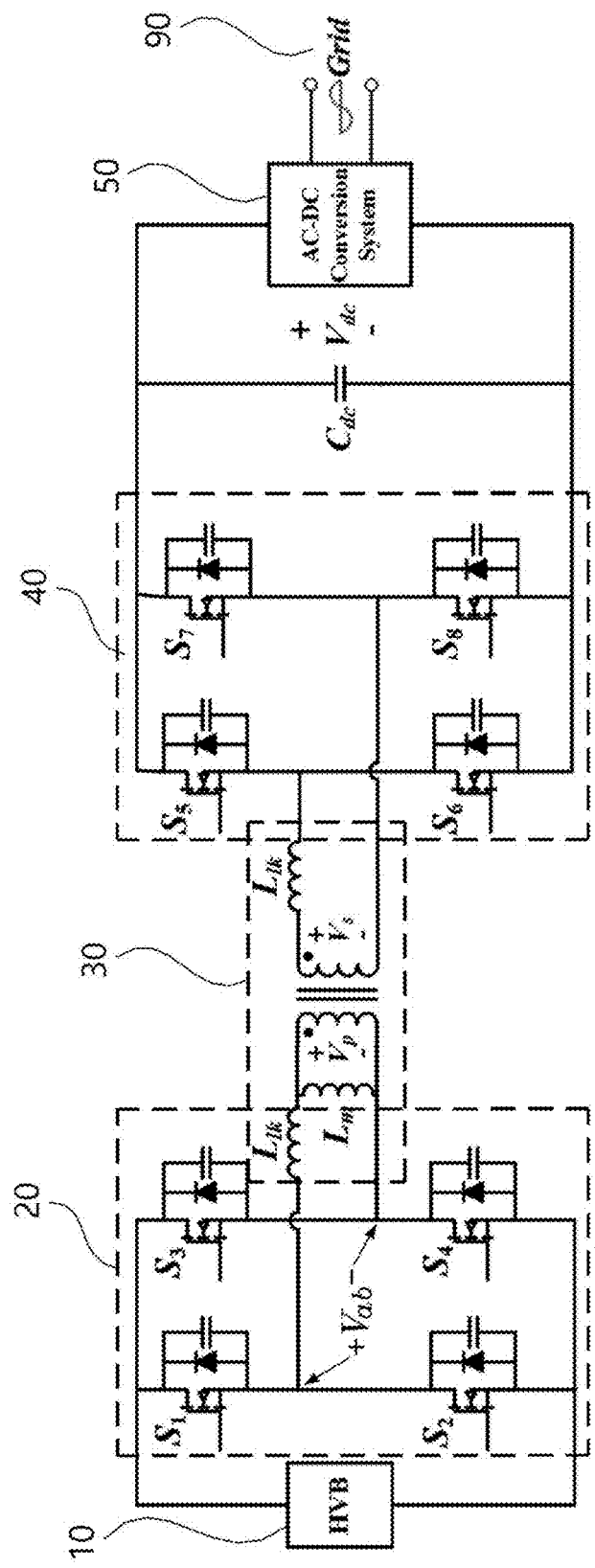
FIG. 4 illustrates an operation circuit in a G2V or V2G mode of an integrated power conversion apparatus according to an exemplary embodiment of the present disclosure.

FIG. 4 illustrates an operation circuit in a G2V or V2G mode of an integrated power conversion apparatus according to an exemplary embodiment of the present disclosure. For the purpose of the operation to the G2V or the V2G mode, the other side of the AC-DC converter 50 is connected to the power system 90 and the controller opens the selective switch R1 to separate the low voltage stage converter 80 from the tertiary winding Nt of the three-winding transformer 30. Accordingly, in FIG. 4, the tertiary winding Nt, the low voltage stage converter 80, and the low voltage battery 70 are omitted.

Figure 5:
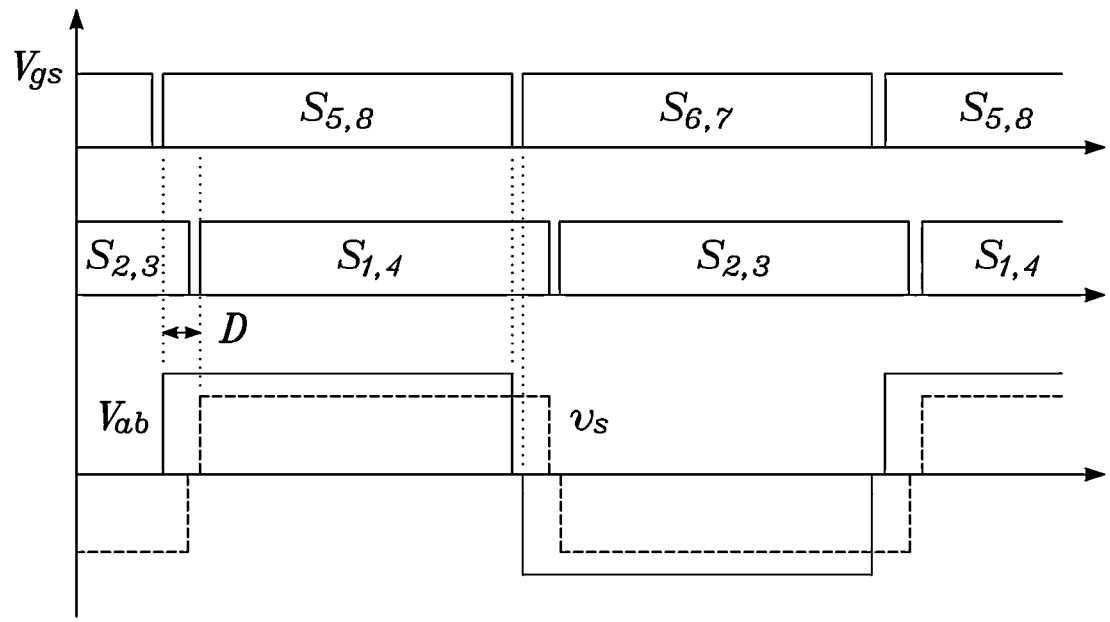
FIG. 5 illustrates an operation waveform in a G2V mode of an integrated power conversion apparatus according to an exemplary embodiment of the present disclosure.

FIG. 5 illustrates an operation waveform in a G2V mode of an integrated power conversion apparatus according to an exemplary embodiment of the present disclosure.

In the G2V mode, as illustrated in the drawing, the high voltage battery 10 is charged from the DC-link voltage using phase shift control of a primary stage voltage and a secondary stage voltage. That is, the controller controls the switching such that switching signals of the fifth and eighth switches S5 and S8 precede switching signals of the first and fourth switches S1 and S4 and switching signals of the sixth and seventh switches S6 and S7 precede switching signals of the second and third switches S2 and S3 to charge the high voltage battery 10 with a power supplied from the power system 90.

Figure 6:
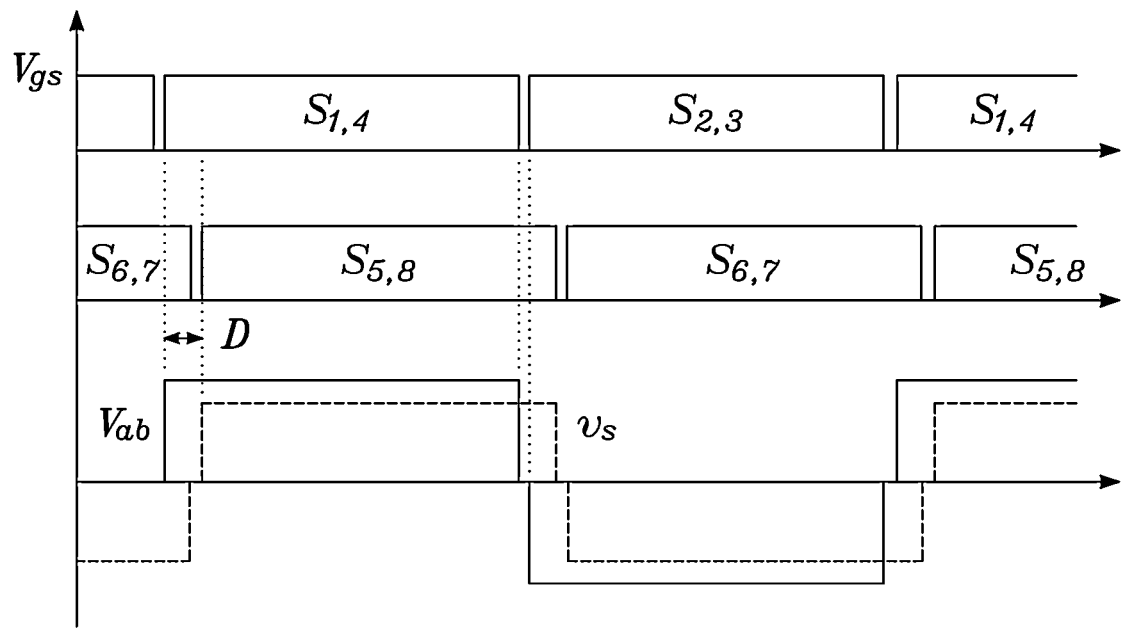
FIG. 6 illustrates an operation waveform in a V2G mode of an integrated power conversion apparatus according to an exemplary embodiment of the present disclosure.

FIG. 6 illustrates an operation waveform in a V2G mode of an integrated power conversion apparatus according to an exemplary embodiment of the present disclosure.

Also in the V2G mode, the power of the high voltage battery 10 is transmitted to the power system 90 using phase shift control of the primary stage voltage and the secondary stage voltage. That is, contrary to the G2V mode, the controller controls the switching such that switching signals of the first and fourth switches S1 and S4 precede switching signals of the fifth and eighth switches S5 and S8 and switching signals of the second and third switches S2 and S3 precede switching signals of the sixth and seventh switches S6 and S7 to transmit the power of the high voltage battery 10 to the power system 90.

Figure 7:
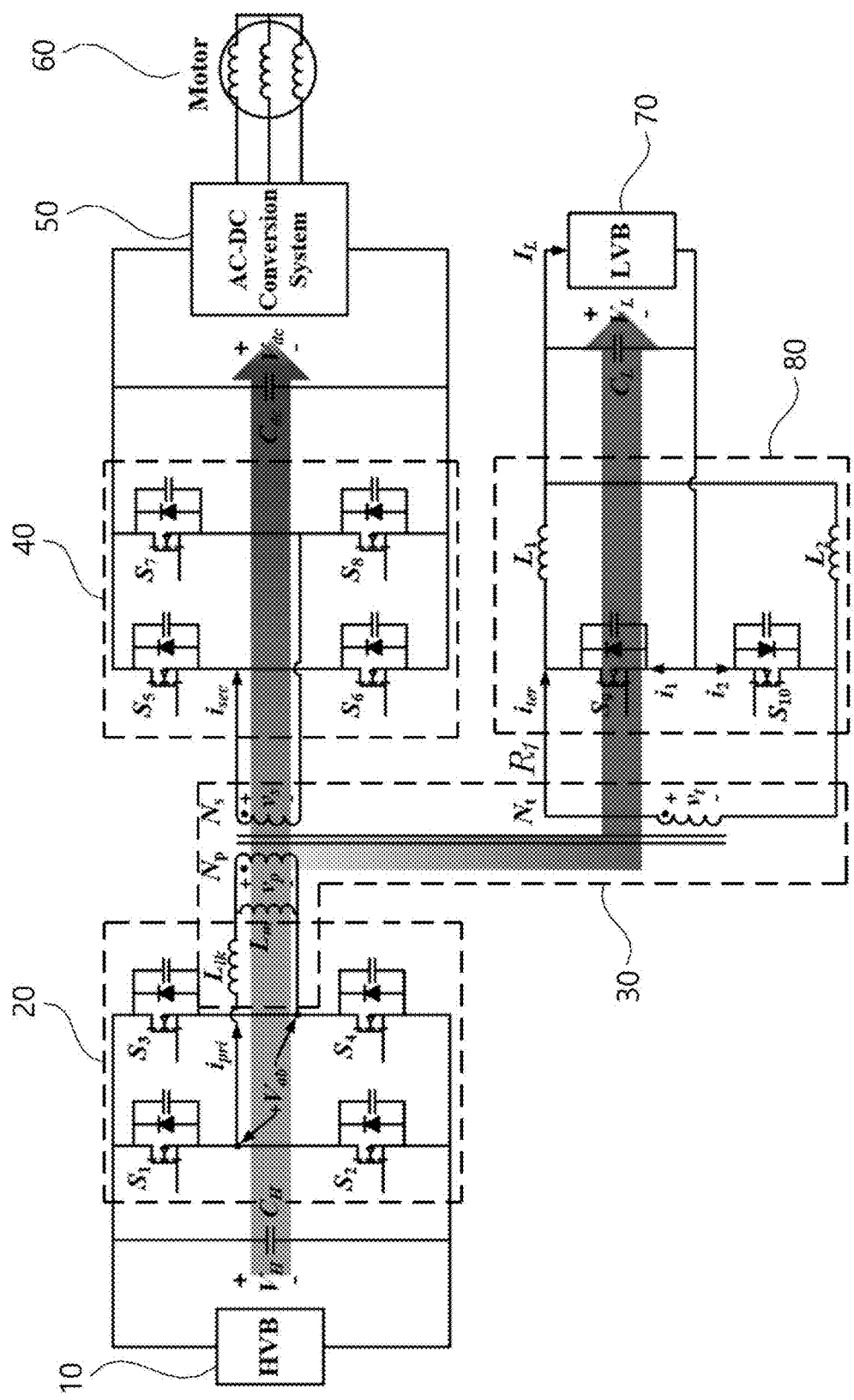
FIG. 7 illustrates an operation circuit in a LDC-TC mode of an integrated power conversion apparatus according to an exemplary embodiment of the present disclosure.
Figure 8:
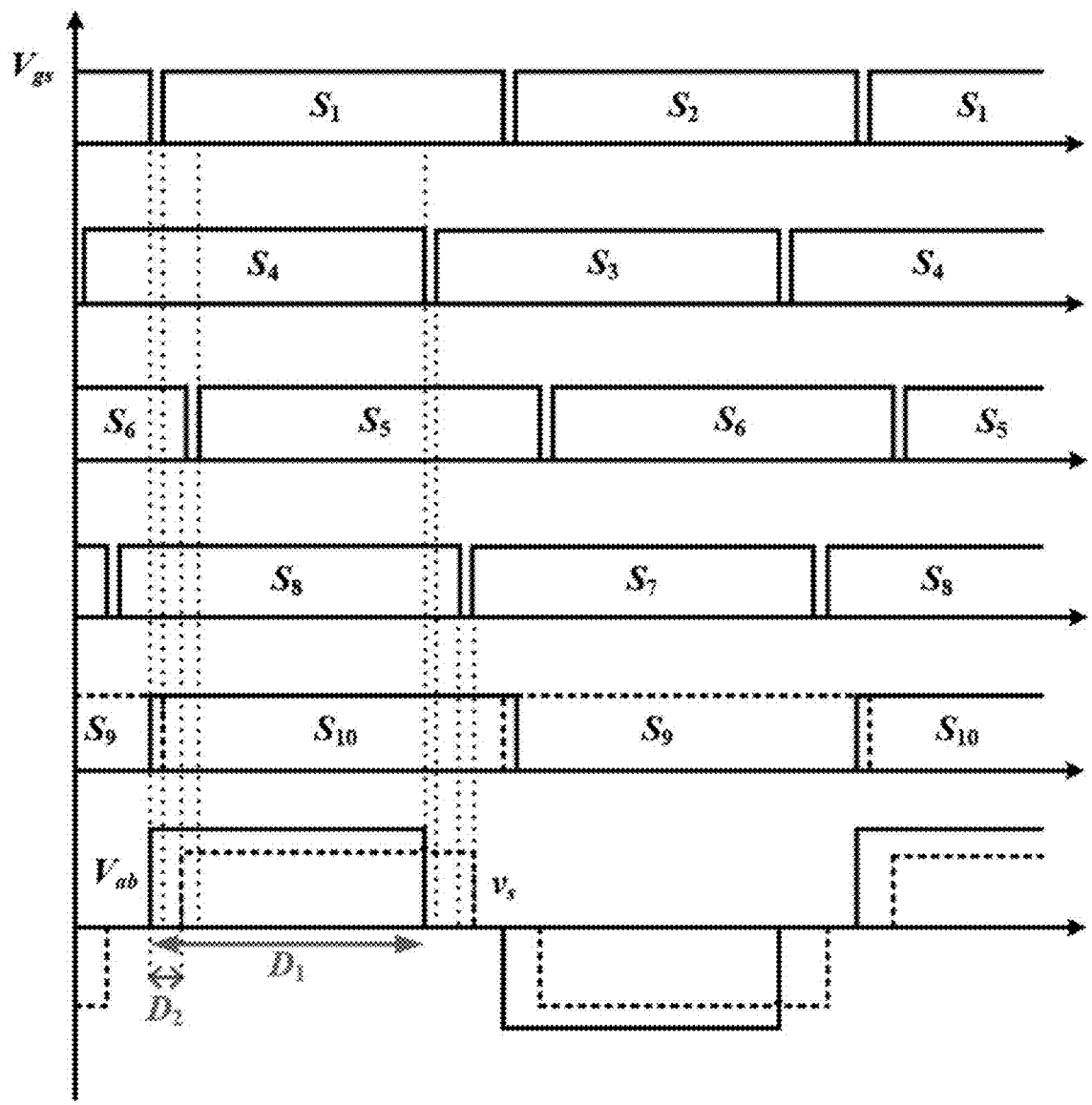
FIG. 8 illustrates an operation waveform in a LDC-TC mode of an integrated power conversion apparatus according to an exemplary embodiment of the present disclosure.

FIG. 7 illustrates an operation circuit in a LDC-TC mode of an integrated power conversion apparatus according to an exemplary embodiment of the present disclosure and FIG. 8 illustrates an operation waveform in an LDC-TC mode.

For the purpose of the operation to the LDC-TC mode, the other side of the AC-DC converter 50 is connected to the motor 60 and the controller shorts the selective switch R1 to connect the low voltage stage converter 80 to the tertiary winding Nt of the three-winding transformer 30.

In the LDC-TC mode, as illustrated in the drawing, the controller adjusts a section in which the first and fourth switches S1 and S4, the second and third switches S2 and S3, the fifth and eighth switches S5 and S8, and the sixth and seventh switches S6 and S7 are simultaneously turned on to D1 by means of phase shift between the leading leg configured by the first and second switches S1 and S2 and the lagging leg configured by the third and fourth switches S3 and S4 of the first H-bridge converter 20 and phase shift between the leading leg configured by the fifth and sixth switches S5 and S6 and the lagging leg configured by the seventh and eighth switches S7 and S8 of the second H-bridge converter 40. At this time, D1 is controlled by the feedback control with a voltage of the low voltage battery 70 as an input. Further, in order to apply phase shift between the primary stage voltage and the secondary stage voltage of the three-winding transformer 30, like the V2G mode, the controller controls the phase shift section between the first and fourth switches S1 and S4 and the fifth and eighth switches S5 and S8 and between the second and third switches S2 and S3 and the sixth and seventh switches S6 and S7 to D2. At this time, D2 is controlled by feedback control with a DC-link voltage required to drive the electric vehicle as an input. That is, two outputs of a DC-link voltage required to drive the motor 60 and a charging voltage of the low voltage battery 70 are controlled with a voltage of the high voltage battery 10 as an input by two duties of D1 and D2.

Figure 9:
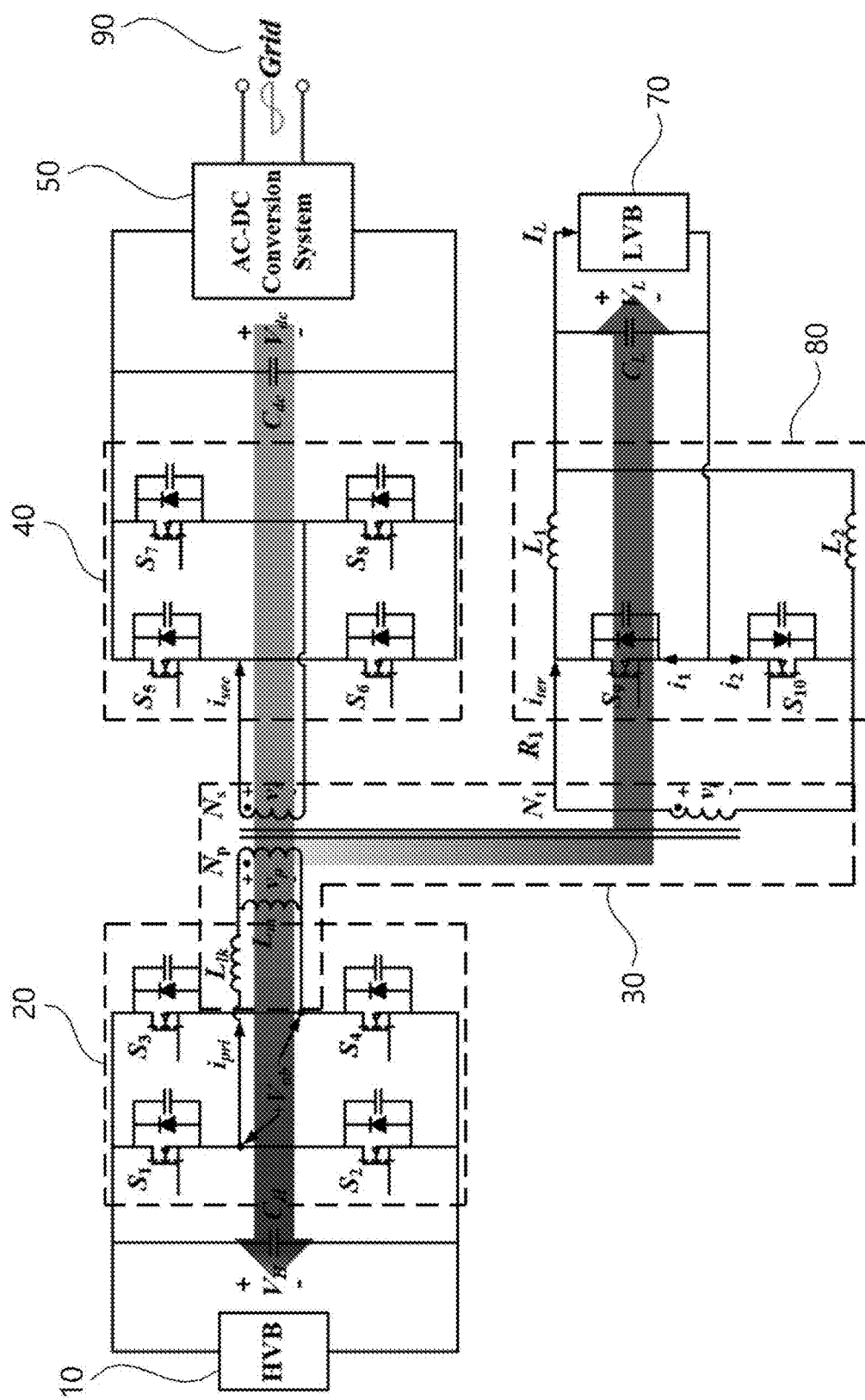
FIG. 9 illustrates an operation circuit in a SC mode of an integrated power conversion apparatus according to an exemplary embodiment of the present disclosure.
Figure 10:
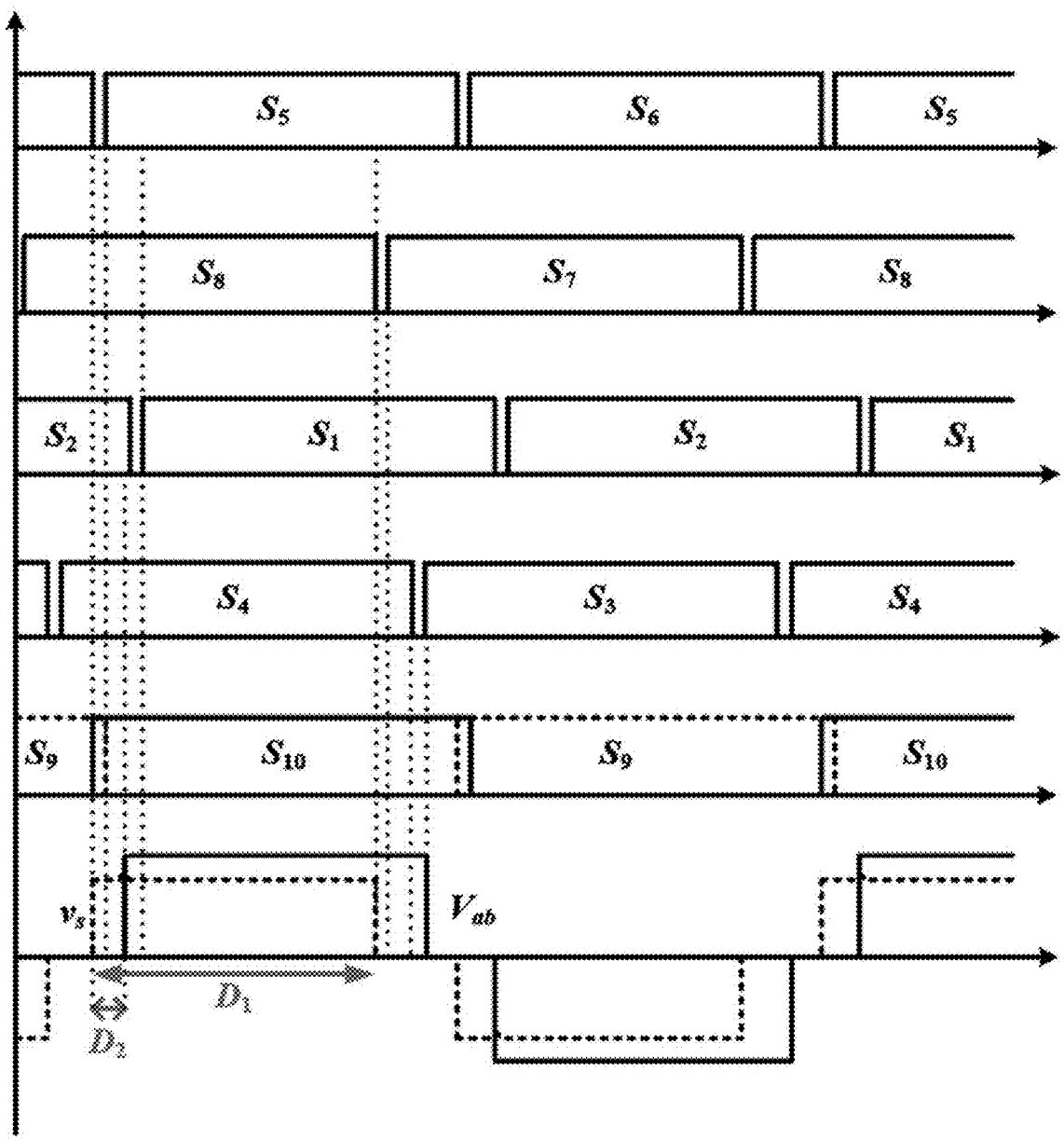
FIG. 10 illustrates an operation waveform in a SC mode of an integrated power conversion apparatus according to an exemplary embodiment of the present disclosure.

FIG. 9 illustrates an operation circuit in a SC mode of an integrated power conversion apparatus according to an exemplary embodiment of the present disclosure and FIG. 10 illustrates an operation waveform in a SC mode.

For the purpose of the operation to the SC mode, the other side of the AC-DC converter 50 is connected to the power system 90 and the controller shorts the selective switch R1 to connect the low voltage stage converter 80 to the tertiary winding Nt of the three-winding transformer 30.

A basic operation of the SC mode is similar to the LDC-TC mode and the difference is the same as the difference between the V2G mode and the G2V mode. That is, in the LDC-TC mode, the primary stage voltage operates to precede the secondary stage voltage (referring to FIG. 8, an overlapping section of the first and fourth switches S1 and S4 precedes an overlapping section of the fifth and eighth switches S5 and S8, that is, located at the left side). In contrast, in the SC mode, the secondary stage voltage operates to precede the primary stage voltage so that the power is reversely transmitted to simultaneously charge the high voltage battery 10 and the low voltage battery 70.

In the SC mode, as illustrated in the drawing, the controller controls a section in which the fifth and eighth switches S5 and S8, the sixth and seventh switches S6 and S7, the first and fourth switches S1 and S4, and the second and third switches S2 and S3 are simultaneously turned on to D1 by means of phase shift between the leading leg configured by the fifth and sixth switches S5 and S6 and the lagging leg configured by the seventh and eighth switches S7 and S8 of the second H-bridge converter 40 and phase shift between the leading leg configured by the first and second switches S1 and S2 and the lagging leg configured by the third and fourth switches S3 and S4 of the first H-bridge converter 20. At this time, D1 is controlled by the feedback control with a voltage of the low voltage battery 70 as an input. Further, in order to apply the phase shift between the secondary stage voltage and the first stage voltage of the three-winding transformer 30, as in the G2V mode, the controller controls the phase shift section between the fifth and eighth switches S5 and S8 and the first and fourth switches S1 and S4 and between the sixth and seventh switches S6 and S7 and the second and third switches S2 and S3 to D2. At this time, D2 is controlled by feedback control with a charging voltage required to charge the high voltage battery 10 as an input. That is, two outputs of a charging voltage of the high voltage battery 10 and a charging voltage of the low voltage battery 70 are controlled with a DC-link voltage as an input by two duties of D1 and D2.

Figure 11:
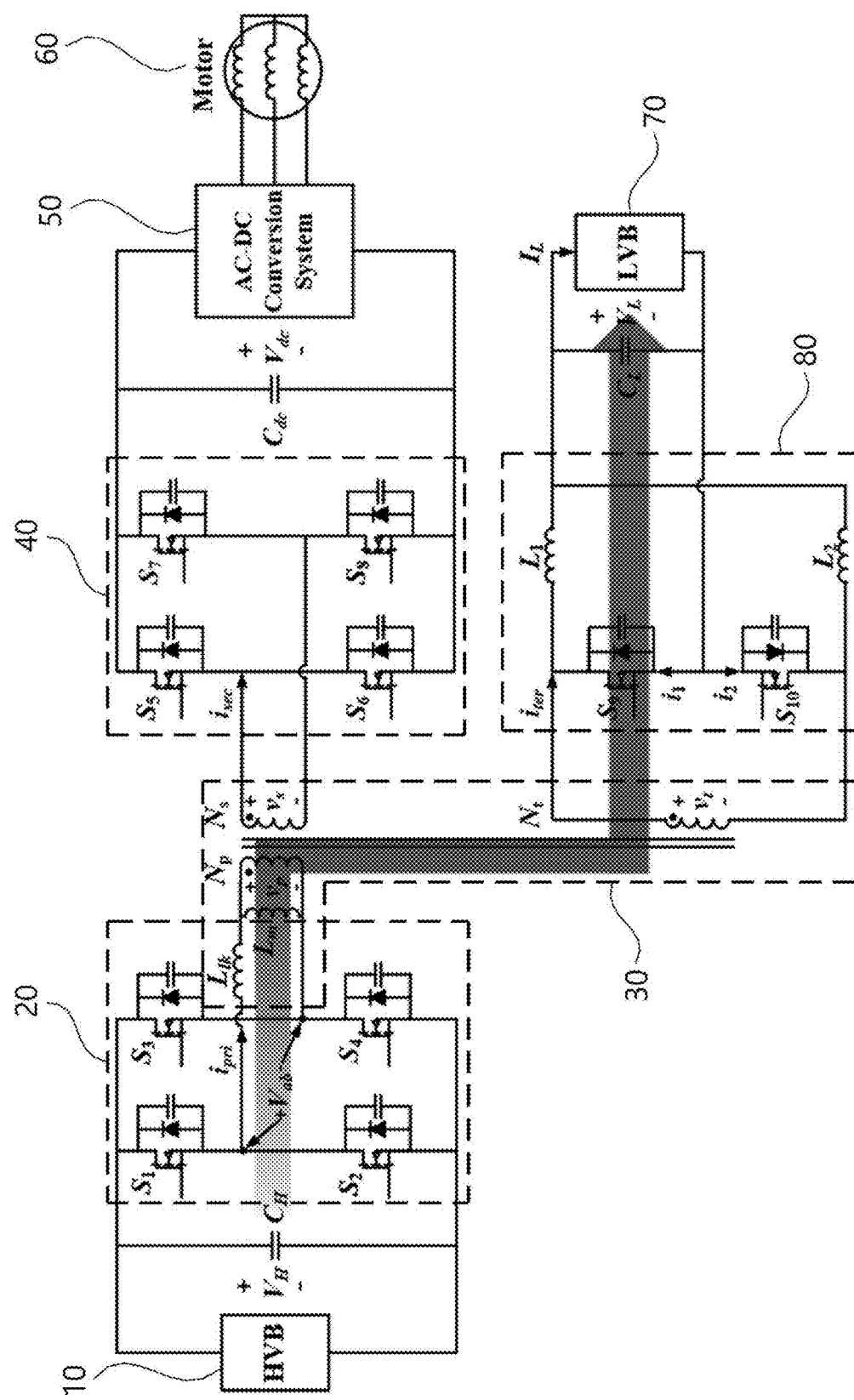
FIG. 11 illustrates an operation circuit in a LDC mode of an integrated power conversion apparatus according to an exemplary embodiment of the present disclosure.
Figure 12:
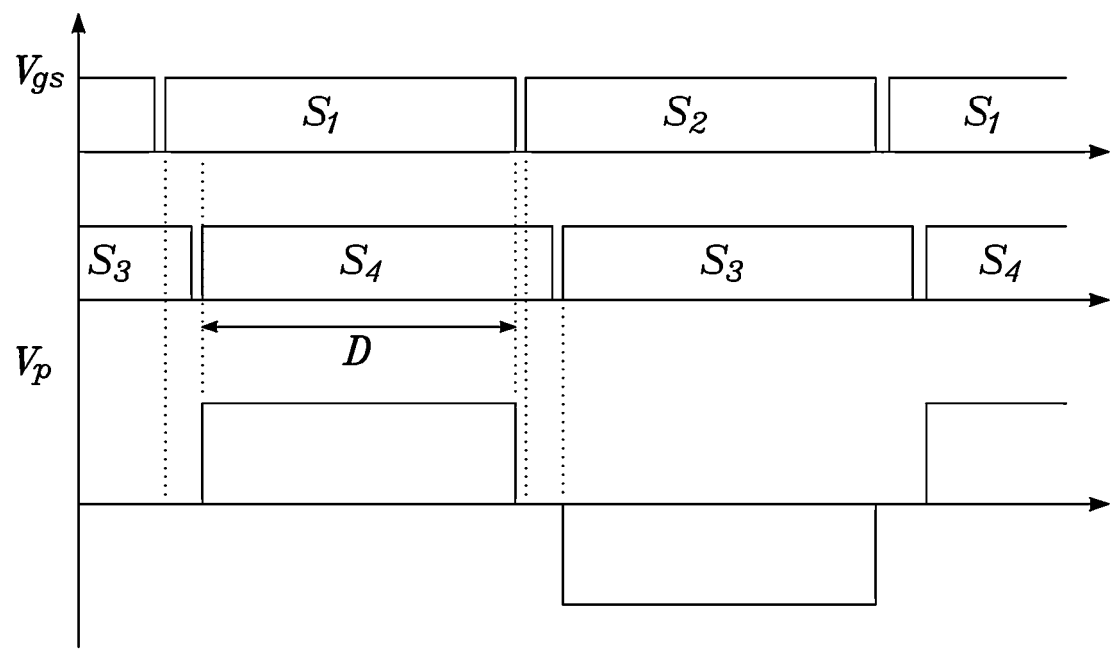
FIG. 12 illustrates an operation waveform in a LDC mode of an integrated power conversion apparatus according to an exemplary embodiment of the present disclosure.

FIG. 11 illustrates an operation circuit in a LDC mode of an integrated power conversion apparatus according to an exemplary embodiment of the present disclosure and FIG. 12 illustrates an operation waveform in a LDC mode.

For the purpose of the operation to the LDC mode, the other side of the AC-DC converter 50 is connected to the motor 60 and the controller shorts the selective switch R1 to connect the low voltage stage converter 80 to the tertiary winding Nt of the three-winding transformer 30.

In the LDC mode, the controller charges the low voltage battery 70 from a power of the high voltage battery 10 by means of the phase shift between the leading leg configured by the first and second switches S1 and S2 and the lagging rags configured by the third and fourth switches S3 and S4 of the first H-bridge converter 20.

As described above, according to the integrated power conversion apparatus and a control method according to the exemplary embodiment of the present disclosure, all three power conversion apparatuses including the on-board battery charger OBC, the low voltage battery charger LDC, and the traction converter TC are integrated to minimize a number of entire elements and perform the same function as the isolated power conversion system of the related art.

Hereinafter, the comparison between the integrated power conversion apparatus according to the exemplary embodiment of the present disclosure and the isolated power conversion system of the related art, an OBC/LDC integrated power conversion system, and the OBC/TC integrated power conversion system will be described.

Figure 13:
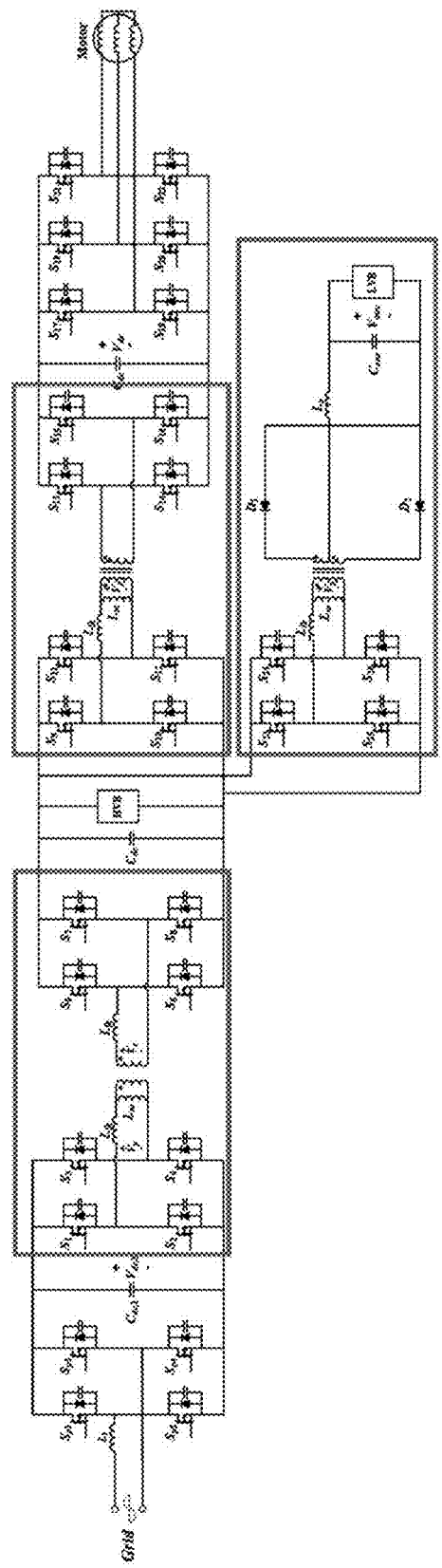
FIG. 13 illustrates a configuration of an isolated power conversion system of the related art.
Figure 14:
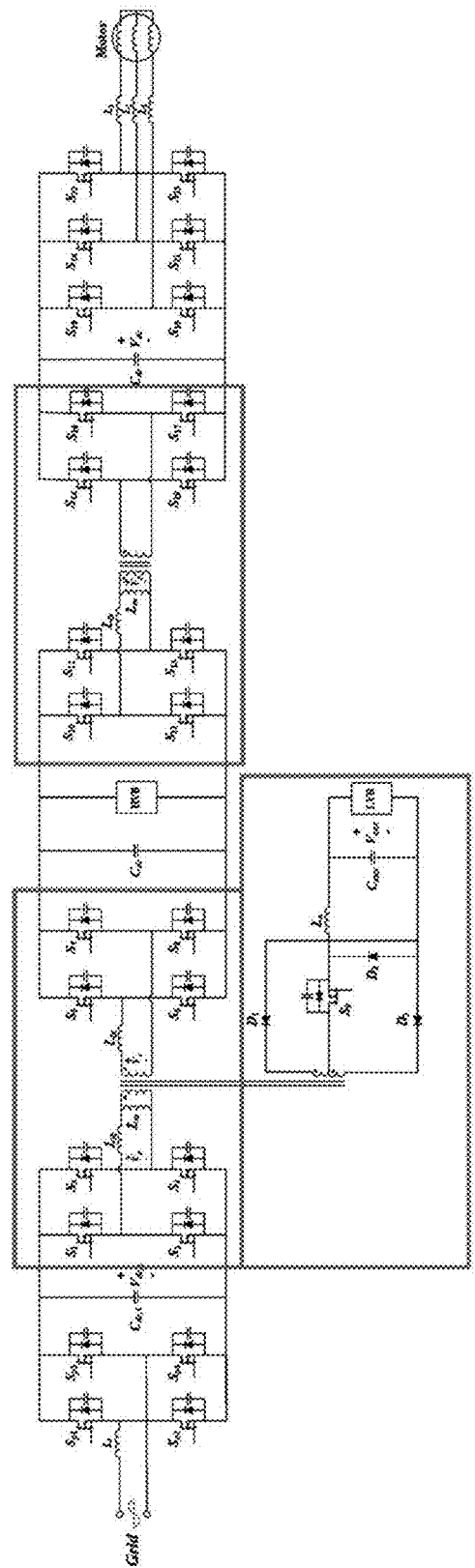
FIG. 14 illustrates a configuration of an OBC/LDC integrated power conversion system.
Figure 15:
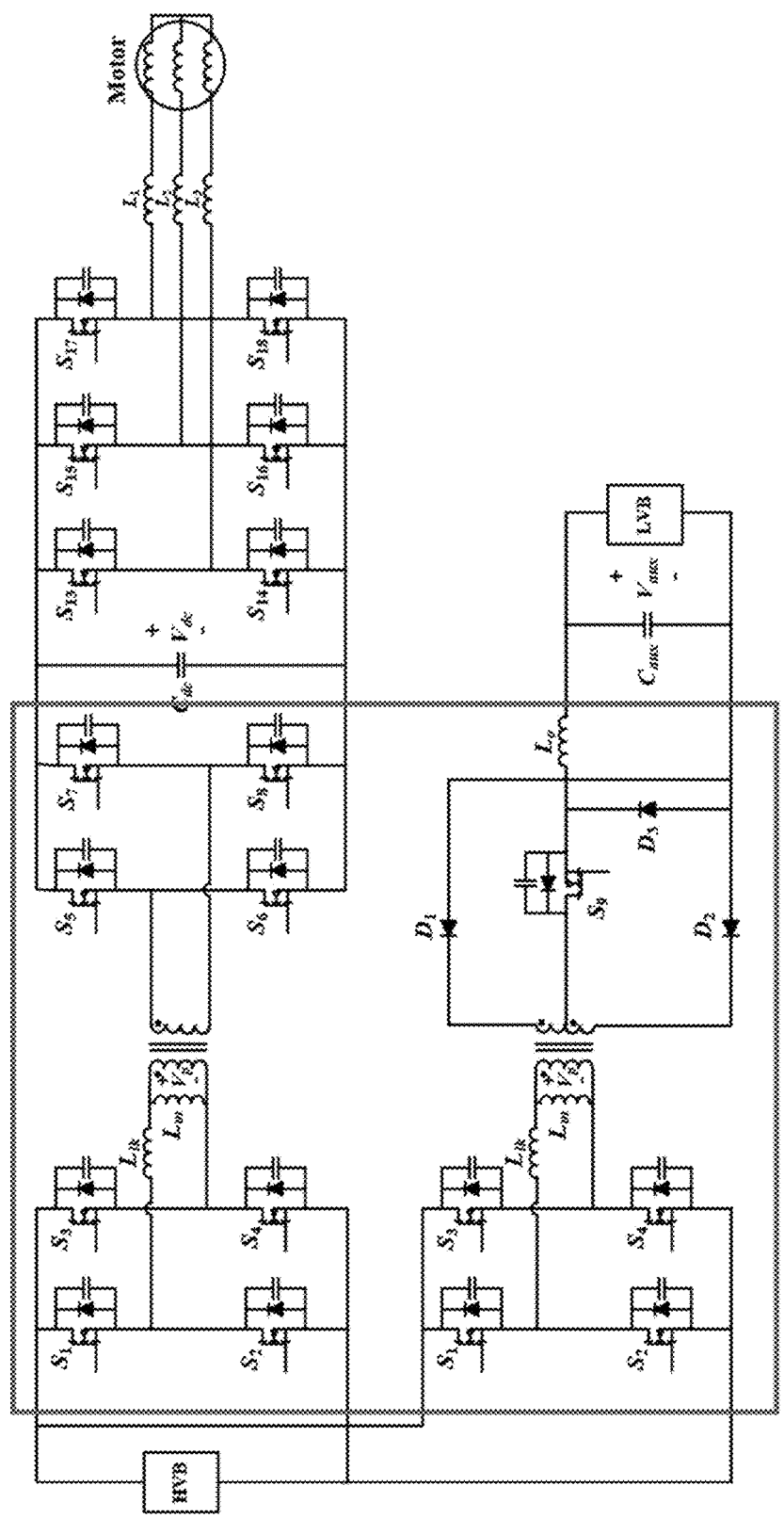
FIG. 15 illustrates a configuration of an OBC/TC integrated power conversion system.

FIG. 13 illustrates a configuration of an isolated power conversion system of the related art, FIG. 14 illustrates a configuration of an OBC/LDC integrated power conversion system, and FIG. 15 illustrates a configuration of an OBC/TC integrated power conversion system. In FIGS. 13 to 15, the power conversion system is illustrated in the red box.

Comparison with isolated power conversion system of the related art: Referring to FIGS. 3 and 13, in the integrated power conversion apparatus according to the exemplary embodiment of the present disclosure, a number of switches is reduced by 55% and a number of transformers is reduced by 66% so that the entire system volume is reduced (that is, a power density is increased) and the economic efficiency is improved. Further, the number of all controllers which operate the switches and adjust an output is reduced to reduce the number of elements included in a control board to improve the power density and the economic efficiency. Further, all the functions which are performed in the related art are performed.

Comparison with OBC/LDC integrated power conversion system: Referring to FIGS. 3 and 14, a number of switches is reduced by 50% and a number of transformers is reduced by 50% so that the entire system volume is reduced (that is, a power density is increased) and the economic efficiency is improved. Further, the number of all controllers which operate the switches and adjust an output is reduced to reduce the number of elements included in a control board to improve the power density and the economic efficiency. Further, all the functions which are performed in the related art are performed.

Comparison with OBC/TC integrated power conversion system: Referring to FIGS. 3 and 15, a number of switches is reduced by 38% and a number of transformers is reduced by 50% so that the entire system volume is reduced (that is, a power density is increased) and the economic efficiency is improved. Further, the number of all controllers which operate the switches and adjust an output is reduced to reduce the number of elements included in a control board to improve the power density and the economic efficiency. Further, all the functions which are performed in the related art are performed.

As described above, according to the integrated power conversion apparatus and the control method according to the exemplary embodiment of the present disclosure, a minimum number of elements is used to perform all necessary functions for the power conversion system for an electric vehicle, the size of the entire system is reduced, and the economic efficiency is increased. That is, under the assumption that the same switch and transformer are used, the same function may be performed with the cost and a volume which are at least 60% lower than the isolated power conversion system of the related art, at least 50% lower than the OBC/LDC integrated power conversion system, and at least 40% lower than the OBC/TC integrated power conversion system.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protective scope of the present disclosure should be construed based on the following claims, and all the technical concepts in the equivalent scope thereof should be construed as falling within the scope of the present disclosure.

What is claimed is:

1. An integrated power conversion apparatus for an electric vehicle, comprising:
   a first H-bridge converter with one side connected to a high voltage battery;
   a three-winding transformer in which a primary winding is connected to the other side of the first H-bridge converter;
   a second H-bridge converter with one side which is connected to a secondary winding of the three-winding transformer;
   an AC-DC converter in which one side is connected to the other side of the second H-bridge converter and the other side is selectively connected to a motor or a power system; and
   a low voltage stage converter in which one side is selectively connected to a tertiary winding of the three-winding transformer through a selective switch and the other side is connected to a low voltage battery.

2. The integrated power conversion apparatus according to claim 1, wherein the first H-bridge converter includes first and second switches which configure a leading leg and third and fourth switches which configure a lagging leg, and the second H-bridge converter includes fifth and sixth switches which configure a leading leg and seventh and eighth switches which configure lagging leg.

3. The integrated power conversion apparatus according to claim 2, further comprising:
   a controller which controls the switching of the first to fourth switches of the first H-bridge, the fifth to eighth switches of the second H-bridge converter, and the selective switch to operate in any one of a G2V mode which charges the high voltage battery with a power supplied from the power system, a V2G mode which transmits the power of the high voltage battery to the power system, an LDC-TC mode which drives the motor while charging the low voltage battery with a power of the high voltage battery, an SC mode which simultaneously charges the high voltage battery and the low voltage battery with the power supplied from the power system, and an LDC mode which charges the low voltage battery with the power of the high voltage battery.

4. The integrated power conversion apparatus according to claim 3, wherein when it is controlled to operate in the G2V mode, the other side of the AC-DC converter is connected to the power system, the controller opens the selective switch to separate the low voltage stage converter from the tertiary winding of the three-winding transformer and controls the switching such that switching signals of the fifth and eighth switches precede switching signals of the first and fourth switches and switching signals of the sixth and seventh switches precede switching signals of the second and third switches.

5. The integrated power conversion apparatus according to claim 3, wherein when it is controlled to operate in the V2G mode, the other side of the AC-DC converter is connected to the power system, the controller opens the selective switch to separate the low voltage stage converter from the tertiary winding of the three-winding transformer and controls the switching such that switching signals of the first and fourth switches precede switching signals of the fifth and eighth switches and switching signals of the second and third switches precede switching signals of the sixth and seventh switches.

6. The integrated power conversion apparatus according to claim 3, wherein when it is controlled to operate in the LDC-TC mode, the other side of the AC-DC converter is connected to the motor and the controller shorts the selective switch to connect the low voltage stage converter to the tertiary winding of the three-winding transformer, adjusts a section in which the first and fourth switches, the second and third switches, the fifth and eighth switches, and the sixth and seventh switches are simultaneously turned on by means of a phase shift between the leading leg configured by the first and second switches and the lagging leg configured by the third and fourth switches of the first H-bridge converter and a phase shift between the leading leg configured by the fifth and sixth switches and the lagging leg configured by the seventh and eighth switches of the second H-bridge converter and adjusts a phase shift section between the first and fourth switches and the fifth and eighth switches and between the second and third switches and the sixth and seventh switches.

7. The integrated power conversion apparatus according to claim 3, wherein when it is controlled to operate in the SC mode, the other side of the AC-DC converter is connected to the power system and the controller shorts the selective switch to connect the low voltage stage converter to the tertiary winding of the three-winding transformer, adjusts a section in which the fifth and eighth switches, the sixth and seventh switches, the first and fourth switches, and the second and third switches are simultaneously turned on by means of a phase shift between the leading leg configured by the fifth and sixth switches and the lagging leg configured by the seventh and eighth switches of the second H-bridge converter and a phase shift between the leading leg configured by the first and second switches and the lagging leg configured by the third and fourth switches of the first H-bridge converter and adjusts a phase shift section between the fifth and eighth switches and the first and fourth switches and between the sixth and seventh switches and the second and third switches.

8. The integrated power conversion apparatus according to claim 3, wherein when it is controlled to operate in the LDC mode, the other side of the AC-DC converter is connected to the motor and the controller shorts the selective switch to connect the low voltage stage converter to the tertiary winding of the three-winding transformer and charges the low voltage battery by means of a phase shift between the leading leg configured by the first and second switches and the lagging leg configured by the third and fourth switches of the first H-bridge converter.

9. The integrated power conversion apparatus according to claim 2, wherein the high voltage battery is connected to a upper contact of the first switch and the third switch and a lower contact of the second switch and the fourth switch, the primary winding is connected to a contact between the first switch and the second switch and a contact between the third switch and the fourth switch, one side of the AC-DC converter is connected to an upper contact of the fifth switch and the seventh switch and a lower contact of the sixth switch and the eighth switch, and the secondary winding is connected to a contact between the fifth switch and the sixth switch and a contact between the seventh switch and the eighth switch.

10. The integrated power conversion apparatus according to claim 2, wherein the low voltage stage converter includes a ninth switch and a tenth switch, the tertiary winding is connected to an upper contact of the ninth switch and a lower contact of the tenth switch, and the low voltage battery is connected to the upper contact of the ninth switch and a contact between the ninth switch and the tenth switch.

11. A control method of an integrated power conversion apparatus for an electric vehicle including: a three-winding transformer in which a primary winding is connected to the other side of the first H-bridge converter; a second H-bridge converter with one side which is connected to a secondary winding of the three-winding transformer; an AC-DC converter in which one side is connected to the other side of the second H-bridge converter and the other side is selectively connected to a motor or a power system; and a low voltage stage converter in which one side is selectively connected to a tertiary winding of the three-winding transformer through a selective switch and the other side is connected to a low voltage battery, wherein the first H-bridge converter includes first and second switches which configure a leading leg and third and fourth switches which configure a lagging leg, the second H-bridge converter includes fifth and sixth switches which configure a leading leg and seventh and eighth switches which configure a lagging leg, the method comprising: controlling the switching of the first to fourth switches of the first H-bridge converter, the fifth to eighth switches of the second H-bridge, and the selective switch.

12. The control method of an integrated power conversion apparatus according to claim 11, wherein the controlling of the switching includes:

controlling to operate in any one of a G2V mode which charges the high voltage battery with a power supplied from the power system, a V2G mode which transmits the power of the high voltage battery to the power system, an LDC-TC mode which drives the motor while charging the low voltage battery with a power of the high voltage battery, an SC mode which simultaneously charges the high voltage battery and the low voltage battery with the power supplied from the power system, and an LDC mode which charges the low voltage battery with the power of the high voltage battery.

* * * * *